(12) United States Patent
Wang

(10) Patent No.: US 11,777,590 B2
(45) Date of Patent: Oct. 3, 2023

(54) MESSAGE SET AND A MESSAGING METHOD FOR VEHICULAR COMMUNICATION

(71) Applicant: Volvo Car Corporation, Gothenburg (SE)

(72) Inventor: Wei Wang, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 269 days.

(21) Appl. No.: 17/197,294

(22) Filed: Mar. 10, 2021

(65) Prior Publication Data
US 2021/0288712 A1   Sep. 16, 2021

(30) Foreign Application Priority Data

Mar. 11, 2020   (CN) .......................... 202010165483.6

(51) Int. Cl.
| | |
|---|---|
| *H04B 7/155* | (2006.01) |
| *H04W 4/46* | (2018.01) |
| *H04W 4/44* | (2018.01) |
| *H04L 9/30* | (2006.01) |
| *G06Q 20/32* | (2012.01) |
| *H04W 12/037* | (2021.01) |
| *H04W 88/04* | (2009.01) |

(52) U.S. Cl.
CPC .......... *H04B 7/155* (2013.01); *G06Q 20/325* (2013.01); *H04L 9/30* (2013.01); *H04W 4/44* (2018.02); *H04W 4/46* (2018.02); *H04W 12/037* (2021.01); *H04W 88/04* (2013.01)

(58) Field of Classification Search
CPC .......... H04W 4/44; H04W 4/46; H04W 4/40; H04W 4/42; H04W 4/41; H04W 4/43; H04W 4/45
See application file for complete search history.

(56) References Cited

U.S. PATENT DOCUMENTS

| | | | |
|---|---|---|---|
| 11,017,665 B1 * | 5/2021 | Roy ...................... | B60W 30/06 |
| 2017/0243485 A1 * | 8/2017 | Rubin .................... | G08G 1/052 |
| 2020/0028804 A1 * | 1/2020 | Ergen ..................... | H04W 4/08 |

FOREIGN PATENT DOCUMENTS

WO    WO-2018027996 A1 *   2/2018   .......... H04L 5/0048

* cited by examiner

*Primary Examiner* — Khalid W Shaheed
(74) *Attorney, Agent, or Firm* — Clements Bernard Walker; Christopher L. Bernard

(57) ABSTRACT

A message set for vehicular communication, including a message header and a message content, wherein the message set is set to be sent by a source vehicle, forwarded by one or more relay vehicles, and received by a terminal device, the message header including: a relay information indicator that indicates whether the message set should be forwarded by said relay vehicle receiving said message set; a vehicle information indicator indicating a unique identification data for the source vehicle; a payment information indicator that indicates an available payment information for the source vehicle; and a terminal type indicator indicating the type of terminal device for receiving the message set. The present disclosure also discloses a messaging method for delivering the message set.

17 Claims, 2 Drawing Sheets

MESSAGE SET AND A MESSAGING METHOD FOR VEHICULAR COMMUNICATION

CROSS-REFERENCE TO RELATED APPLICATION

This disclosure claims the benefit of Chinese Patent Application No. 202010165483.6, filed Mar. 11, 2020, the contents of which are hereby incorporated by reference in their entirety.

TECHNICAL FIELD

The present disclosure relates to a message set and a messaging method for vehicular communication.

BACKGROUND

Vehicular communication includes Vehicle-to-Everything (V2X) communication. V2X communication is the transmission of information from a vehicle to any entity that may affect the vehicle, and vice versa. V2X is a vehicular communication system that combines other, more specific types of communication, such as V2I (Vehicle-to-Infrastructure), V2I (Vehicle-to-Infrastructure), V2N (Vehicle-to-Network), V2V (Vehicle-to-Vehicle), V2P (Vehicle-to-Pedestrian), V2D (Vehicle-to-Device) and V2G (Vehicle-to-Grid). The main motivations for developing V2X are road safety, traffic efficiency and energy efficiency. Depending on the underlying technology employed, there are two types of V2X communication technologies: cellular networks and other technologies that support direct device-to-device communication (such as DSRC, PC5, Bluetooth, Wi-Fi, etc.).

However, each wireless communication technology has communication limitations. Cellular networks are limited by the coverage of base stations. Direct link communication is limited by its direct link communication range. If a vehicle is not within range of a base station or roadside smart infrastructure, information exchange will be blocked, which can easily cause risks especially in certain emergency situations.

SUMMARY

So as to solve the above technical problems, this disclosure proposes a message set for vehicular communication and a messaging method for delivering the message set. In this disclosure, a direct connection communication technology (such as a PC5 interface or a DSRC interface) is employed to use the vehicle as a relay. If the source vehicle is not within range of a communication base station or roadside smart unit, it can send a message to a surrounding relay vehicle that is within its communication range, and the surrounding vehicle can cascade that message to a communication base station or roadside smart unit that is a long distance away.

The present disclosure discloses a message set for vehicular communication that includes a message header and message content. The message set is set to be sent by a source vehicle after one or more portion of the message set being encrypted, forwarded by one or more relay vehicles, and received by a terminal device. The message header includes: a relay information indicator that indicates whether the message set should be forwarded by the relay vehicle receiving the message set; a vehicle information indicator that indicates the source vehicle to distinguish the message set from the source vehicle from a message set from another source vehicle; and a payment information indicator that indicates available payment information for the source vehicle to ensure any charge incurred for services associated therewith will be charged to the source vehicle instead of the one or more relay vehicles; and a terminal type indicator that indicates the type of the terminal device receiving the message set as a final destination of the message set.

According to an embodiment, the message header further includes a location information indicator that indicates one or more geographic coordinates of the source vehicle when sending out the message set.

According to an embodiment, the source vehicle, the relay vehicle, and the terminal device each have a corresponding communication range. The relay information indicator includes one of a relay identification, or a non-relay identification. When the relay information indicator is a relay identification, the relay vehicle receiving the message set does not process the message set as received and forwards the message set in a broadcast manner so that the message set can be received by the terminal equipment within the communication range of the relay vehicle or another relay vehicle within the communication range of the relay vehicle. The message set is set to have portions of the message set other than the relay information indicator encrypted with a private key. The private key is retained only by the source vehicle and terminal device for encrypting and decrypting the portions other than the relay information indicator.

According to an embodiment, the relay information indicator is encrypted with the public key. The public key is retained by the source vehicle, the relay vehicle, and the terminal device for encrypting and decrypting the relay information indicator.

According to an embodiment, the relay information indicator is not encrypted.

According to an embodiment, the available payment information includes a SIM ID, ICCID, VIN, User ID of the source vehicle or other payment information bound to the source vehicle.

According to an embodiment, the terminal type indicator includes a cloud server processing identification and a roadside smart unit processing identification. The terminal device includes a roadside smart unit and a communication base station that is wirelessly connected to the cloud server. The message set is set to be forwarded by the relay vehicle to the communication base station for processing by the cloud server when the terminal type indicator is set to be the cloud server processing identification. The message set is set to be forwarded by the relay vehicle to the roadside smart unit and processed by the roadside smart unit when the terminal type indicator is set to be the roadside smart unit processing identification.

According to an embodiment, the message set is set to be transmitted between the relay vehicle and the communication base station by means of a cellular network interface. The message set is provided for transmission between the relay vehicle and the roadside smart unit by means of a direct connection communication interface.

According to an embodiment, the message set is set to be repeatedly sent in a broadcast manner at a first time interval by the source vehicle and is set to be repeatedly forwarded in a broadcast manner at the first time interval by the relay vehicle. The first time interval's length is inversely correlated with the source vehicle's speed when sending the message set. The first time interval's length is set to reach its maximum length when the source vehicle is stationary.

According to an embodiment, the message set is so configured that when it is no longer received by the relay vehicle within a second time interval after the message set was first received by the relay vehicle, the message set is set to continue to be forwarded for a predetermined number of times and then to stop being forwarded by the relay vehicle, the second time interval is longer than the maximum length of the first time interval.

According to an embodiment, the message set is set to stop being forwarded by the relay vehicle if the difference between current geographic coordinates of the relay vehicle and geographic coordinates of the relay vehicle when receiving the message set for a first time exceeds a first predetermined distance.

According to an embodiment, the message set is set to stop being forwarded by the relay vehicle if the relay vehicle's travel distance after the message set was first received exceeds a second predetermined distance.

According to an embodiment, the message set is set to stop being forwarded in a broadcast manner by the relay vehicle and to be repeatedly sent to the terminal device within a predetermined period of time by the relay vehicle if the relay vehicle has confirmed that the message set has been sent to the terminal device.

The present disclosure also discloses a messaging method for delivering the aforementioned message set. The messaging method includes the steps of: determining whether a terminal device is presented within the communication range of the source vehicle, sending the message set to the terminal device by the source vehicle if the terminal device is presented within the communication range of the source vehicle, and repeatedly sending the message set in a broadcast manner at a first time interval by the source vehicle if the terminal device is not presented within the communication range of the source vehicle; determining whether the terminal device is presented within the communication range of the relay vehicle receiving the message set, sending the message set to the terminal device by the relay vehicle if the terminal device is presented within the communication range of the relay vehicle, and repeatedly forwarding the message set in a broadcast manner at the first time interval by the relay vehicle if terminal device is not presented within the communication range of the relay vehicle; and stopping the forwarding of the message set in a broadcast manner by the relay vehicle and repeatedly sending the message set to the terminal device for a predetermined period of time to ensure the integrity of the message set received by the terminal device if the relay vehicle has confirmed that the message set has been sent to the terminal device. The messaging method further includes the step of: after the relay vehicle receives the message set for the first time, forwarding the message set for a predetermined number of times at a first time interval in a broadcast manner by the relay vehicle after the relay vehicle has not received the message set in a second time interval, and then stopping the forwarding of the message set by the relay vehicle, the second time interval being longer than the first time interval. The messaging method further includes: stopping the forwarding of the message set by the relay vehicle if the difference between current geographic coordinates of the relay vehicle and geographic coordinates of the relay vehicle when receiving the message set for a first time exceeds a first predetermined distance. The messaging method further includes: stopping the forwarding of the message set by the relay vehicle if the relay vehicle's travel distance after the message set was first received exceeds a second predetermined distance. The terminal device includes a communication base station and a roadside smart unit. The messaging method further includes the step of: determining whether the message set should be sent to the communication base station or the roadside smart unit by the relay vehicle based on the terminal type indicator.

According to the present disclosure, using the vehicle as a relay vehicle may help the driver to send an emergency message to the communication base station or the roadside smart unit when the source vehicle is not in the coverage of the communication network (e.g., when the source vehicle breaks down in a tunnel or valley and cannot be moved).

According to the present disclosure, a message set including a payment information indicator may help a service provider to charge a source vehicle, rather than a relay vehicle, for the service.

BRIEF DESCRIPTION OF THE DRAWINGS

Embodiments of the present disclosure will now be described by way of embodiment only with reference to the accompanying drawings, wherein.

DETAILED DESCRIPTION

In the following description, specific details are set forth so as to provide a thorough understanding of various illustrative embodiments of the present disclosure. However, it will be understood by those skilled in the art that embodiments of the present disclosure may be practiced without some or all of these specific details. In other instances, well known process operations are not described in detail so as not to unnecessarily obscure relevant aspects of the described embodiments. In the accompanying drawings, throughout several views, similar reference numbers refer to the same or similar functions or features.

Figure 1:
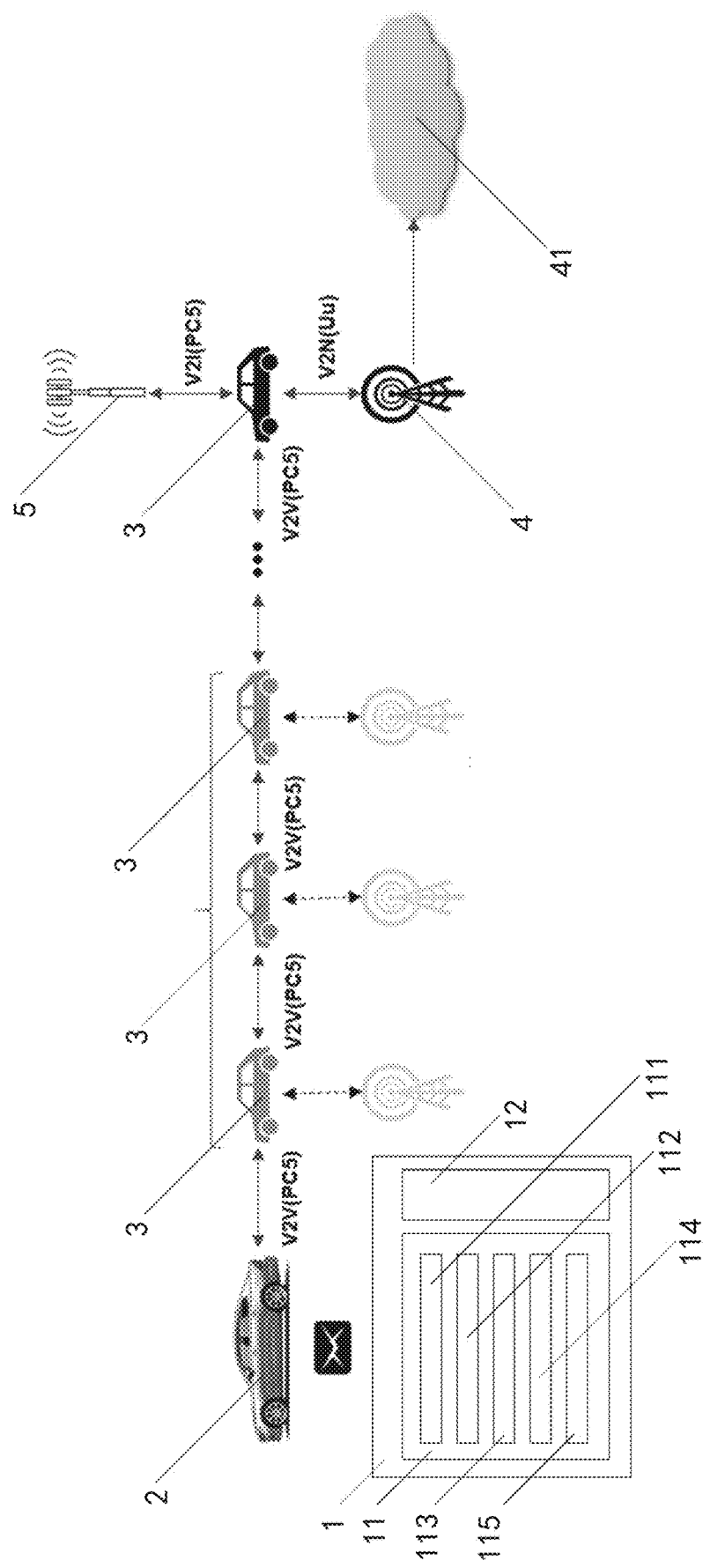
FIG. 1 illustrates a schematic diagram of a message set according to the present disclosure and the transmission of that message set between a vehicle and a vehicle and between a vehicle and a communication base station or a roadside smart unit.

FIG. 1 illustrates a message set according to the present disclosure and a schematic representation of the message set being transmitted between a vehicle and a vehicle and between a vehicle and a communication base station or roadside smart unit. The message set 1 includes a message header 11 and a message content 12. The message set 1 is set to be sent by a source vehicle 2 after one or more portion of the message set 1 being encrypted, forwarded by one or more relay vehicles 3 and received by a terminal device 4, 5. The message header 11 includes a relay information indicator 111, a vehicle information indicator 112, a payment information indicator 113, a terminal type indicator 114, and alternatively may include a location information indicator 115. In this embodiment, the message set 1 may be transmitted between the source vehicle 2 and the relay vehicle 3 by means of a direct communication interface (such as PC5, DSRC, Bluetooth, etc.).

The relay information indicator 111 indicates whether the message set 1 should be forwarded by the relay vehicle 3 receiving the message set 1. The message set 1 is set to have portions other than the relay information indicator 111 encrypted with a private key. The private key is retained only by the source vehicle 2 and the terminal device 4, 5 for encrypting and decrypting the portions of the message set 1 other than the relay information indicator 111. Alternatively, the message set 1 may be set such that the relay information indicator 111 is encrypted with the public key. The public key is retained by the source vehicle 2, the relay vehicle 3, and the terminal device 4, 5 for encrypting and decrypting the relay information indicator 111.

The source vehicle, the relay vehicle, and the terminal device each have a corresponding communication range. The relay information indicator 111 include one of a relay identification, or a non-relay identification. In one example, the relay identification is represented by the number "1" and the non-relay identification is represented by a number or symbol other than "1", where the number "0" is reserved for the identification of the message with the highest priority. When the relay information indicator 111 is set to a relay identification, the relay vehicle 3 receiving the message set 1 does not process the message set 1 as received and forwards the message set 1 in a broadcast manner so that the message set 1 can be received by the terminal device 4, 5 within the communication range of the relay vehicle 3 or another relay vehicle within the communication range of the relay vehicle 3. When the relay information indicator 111 is set to a non-relay identification, the relay vehicle 3 processes the received message set 1 on its own based on the content of the non-relay identification and no longer forwards the message set 1.

The vehicle information indicator 112 indicates unique identification data for the source vehicle 2, such as the frame serial number or engine serial number of the source vehicle 2, so as to distinguish the message set 1 from the source vehicle 2 from a message set from another source vehicle.

The payment information indicator 113 indicates available payment information for the source vehicle 2 to assist the service provider in charging the source vehicle 2, rather than the relay vehicle 3, for the service. Alternatively, the available payment information may include the SIM ID, ICCID, VIN, or User ID of the source vehicle 2, or other payment information bound to the source vehicle 2.

The terminal type indicator 114 indicates the type of terminal device 4, 5 receiving the message set 1 as a final destination of the message set 1, and includes a cloud server processing identification and a roadside smart unit processing identification. The terminal device 4, 5 can be a communication base station 4 wirelessly connected to the cloud server 41, or a roadside smart unit 5. In one example, the terminal type indicator 114 is indicated by the number "1" and the message set 1 is set to be forwarded by the relay vehicle 3 to the communication base station 4 to be processed by the cloud server 41 if the final destination of the message set 1 is a communication base station 4 that may be wirelessly connected to the cloud server 41 or other device transmitting data using a cellular network interface. In another example, the terminal type indicator 114 is indicated by the number "2" and the message set 1 is set to be forwarded by the relay vehicle 3 to be processed by the roadside smart unit 5, if the final destination of the message set 1 is a roadside smart unit 5 or other device transmitting data using a direct connection communication interface.

In one embodiment, the message set 1 may be transmitted between the relay vehicle 3 and the communication base station 4 by means of a cellular network interface. In other embodiments, the message set 1 may also be transmitted between the relay vehicle 3 and the communication base station 4 by means of other communication interfaces for V2N.

In this embodiment, the message set 1 may be transmitted between the relay vehicle 3 and the roadside smart unit 5 by means of the PC5 communication interface. In other embodiments, the message set 1 may also be transmitted between the relay vehicle 3 and the roadside smart unit 5 by means of other communication interfaces for V2I.

The location information indicator 115 indicates the geographical coordinates of the source vehicle 2 when the message set 1 is sent, which may be provided by means of a satellite positioning system such as GPS, GLONASS and BeiDou.

The message set 1 is set to be repeatedly sent in a broadcast manner at a first time interval by the source vehicle 2 and set to be repeatedly forwarded in a broadcast manner at the first time interval by the relay vehicle 3. Alternatively, the first time interval's length is inversely correlated to the source vehicle 2's speed when sending the message set 1. For example, the higher the speed of the source vehicle 2 when the message set 1 is sent, the shorter the length of the first time interval, and vice versa. The first time interval's length is set to reach its maximum length when the source vehicle 2 is stationary.

The message set 1 is set to stop being forwarded by the relay vehicle 3 after it is received by the relay vehicle 3 for the first time and has not been received in the second time interval, after it has continued to be forwarded by the relay vehicle 3 for a predetermined number of times, so as to avoid excessive waste of communication resources, the second time interval being longer than the maximum value of the first time interval.

The message set 1 is set to stop being forwarded by the relay vehicle 3 if the difference between current geographic coordinates of the relay vehicle 3 and geographic coordinates of the relay vehicle 3 receiving the message set 1 for a first time exceeds a first predetermined distance, to avoid excessive waste of communication resources.

The message set 1 is set to stop being forwarded by the relay vehicle 3 if the relay vehicle 3's travel distance after the message set 1 was first received exceeds a second predetermined distance, to avoid excessive waste of communication resources. The relay vehicle 3's travel distance may be provided by an odometer or other device having the function of recording mileage in the relay vehicle 3.

The message set 1 is set to stop being forwarded in a broadcast manner by the relay vehicle 3 and is set to be repeatedly sent to the terminal device 4, 5 for a predetermined period of time, if the relay vehicle 3 has confirmed that the message set 1 has been sent to the terminal device 4, 5, so as to ensure the integrity of the message set 1 received by the terminal device 4, 5.

Figure 2:
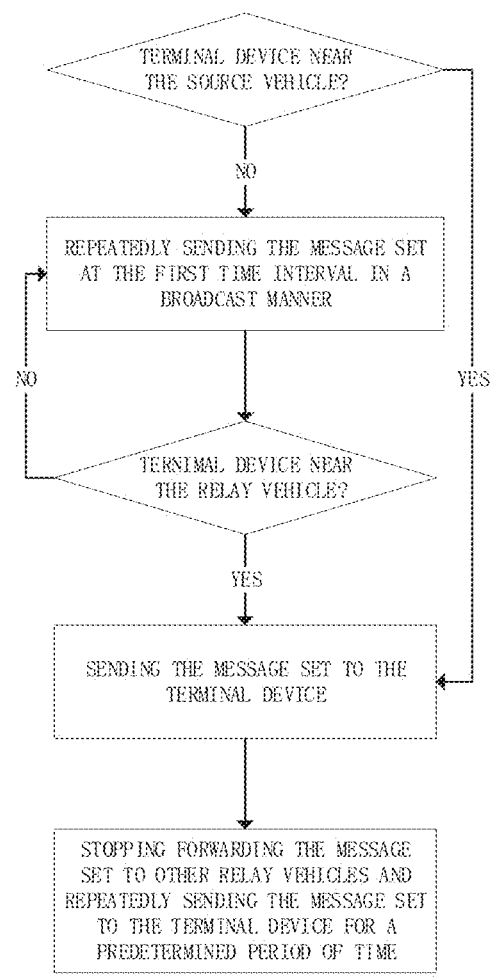
FIG. 2 illustrates a flowchart of a method of messaging according to the present disclosure.

FIG. 2 illustrates a flowchart of a messaging method according to the present disclosure. The method includes:

(A) determining whether the terminal device 4, 5 is presented within the communication range of the source vehicle 2, sending the message set 1 to the terminal device 4, 5 by the source vehicle 2 if the terminal device 4, 5 is presented within the communication range of the source vehicle 2, and repeatedly sending the message set 1 in a broadcast manner at a first time interval by source vehicle 2 if the terminal device 4, 5 is not presented within the communication range of the source vehicle 2, (B) determining whether the terminal device 4, 5 presented within the communication range of the relay vehicle 3 receiving the message set 1, sending the message set 1 to the terminal device 4, 5 by the relay vehicle 3 if the terminal device 4, 5 is presented within the communication range of the relay vehicle 3, and repeatedly forwarding the message set 1 in a broadcast manner at a first time interval by the relay vehicle 3 if the terminal device 4, 5 does not presented within the communication range of the relay vehicle 3, and C) stopping the forwarding of the message set 1 to the another relay vehicle and repeatedly sending the message set 1 to the terminal device for a predetermined period of time by the relay vehicle 3 to ensure the integrity of the message set 1 received by the terminal device 4, 5 if the relay vehicle 3 has confirmed that the message set 1 has been sent to the terminal device 4, 5.

The messaging method according to the present disclosure further includes: after the relay vehicle 3 receives the message set 1 for the first time, forwarding the message set 1 for a predetermined number of times at a first time interval in a broadcast manner by the relay vehicle 3; when the relay vehicle 3 has not received the message set 1 in a second time interval, and then stopping the forwarding of the message set 1 by the relay vehicle 3, the second time interval being longer than the first time interval.

The messaging method according to the present disclosure further includes: stopping the forwarding of the message set 1 by the relay vehicle 3 if the difference between current geographic coordinates of the relay vehicle 3 and geographic coordinates of the relay vehicle 3 when receiving the message set 1 for a first time exceeds a first predetermined distance.

The messaging method according to the present disclosure further includes stopping the forwarding of the message set 1 by the relay vehicle 3 if the relay vehicle 3's travel distance after the message set 1 was first received exceeds a second predetermined distance. The relay vehicle 3's travel distance after may be provided by an odometer or other device having a function of recording miles in the relay vehicle 3.

The messaging method according to the present disclosure further includes determining whether the message set 1 should be sent to the communication base station 4 or to the roadside smart unit 5 by the relay vehicle 3 based on the terminal type indicator 114.

The foregoing description of the preferred embodiment of the present disclosure has been presented for purposes of illustration and description. It is not intended to be exhaustive or to limit the present disclosure to the precise form disclosed, and many modifications and variations are possible in view of the above teachings.

The invention claimed is:

1. A message set (1) for vehicular communication, said message set comprising a message header (11) and a message content (12),
   wherein said message set is set to be sent by a source vehicle (2) after one or more portion of said message set being encrypted, forwarded by one or more relay vehicles (3) and received by a terminal device (4, 5),
   wherein said message header comprises:
   a relay information indicator (111) that indicates whether said message set should be forwarded by said relay vehicle receiving said message set,
   a vehicle information indicator (112) that identifies said source vehicle to distinguish said message set from said source vehicle from a message set from another source vehicle,
   a payment information indicator (113) that indicates available payment information for said source vehicle,
   a terminal type indicator (114) that indicates the type of said terminal device for receiving said message set, and
   a location information indicator (115) that indicates one or more geographic coordinates of said source vehicle when sending out said message set.

2. The message set according to claim 1, wherein said source vehicle, said relay vehicle, and said terminal device each have a corresponding communication range;
   said relay information indicator comprises one of a relay identification, or a non-relay identification,
   when said relay information indicator is a relay identification, said relay vehicle receiving said message set does not process said message set as received and forwards said message set in a broadcast manner,
   said message set is set to have portions of the message set other than said relay information indicator encrypted with a private key, and
   said private key is retained only by said source vehicle and said terminal device for encrypting and decrypting the portions other than said relay information indicator.

3. The message set according to claim 2, wherein said relay information indicator is encrypted with a public key, and
   said public key is retained by said source vehicle, said relay vehicle and said terminal device for encrypting and decrypting said relay information indicator.

4. The message set according to claim 2, wherein said relay information indicator is not encrypted.

5. The message set according to claim 1, wherein said available payment information comprises a SIM ID, ICCID, VIN, User ID of said source vehicle or other payment information bound to said source vehicle.

6. The message set according to claim 1, wherein said terminal type indicator comprises a cloud server processing identification and a roadside smart unit processing identification,
   said terminal device comprises a roadside smart unit (5), and a communication base station (4) wirelessly connected to the cloud server (41),
   when said terminal type indicator is set to be said cloud server processing identification, said message set is set to be forwarded to said communication base station by said relay vehicle to be processed by said cloud server, and
   when said terminal type indicator is set to be said roadside smart unit processing identification, said message set is set to be forwarded to said roadside smart unit by said relay vehicle to be processed by said roadside smart unit.

7. The message set according to claim 4, wherein said message set is set to be transmitted between said relay vehicle and said communication base station by means of a cellular network interface, and
   said message set is set to be transmitted between said relay vehicle and said roadside smart unit by means of a direct connection communication interface.

8. The message set according to claim 1, wherein said message set is set to be repeatedly sent in a broadcast manner at a first time interval by said source vehicle and set to be repeatedly forwarded in a broadcast manner at the first time interval by said relay vehicle,
   said first time interval's length is inversely correlated to said source vehicle's speed when sending said message set, and
   said first time interval's length is set to reach its maximum length when said source vehicle is stationary.

9. The message set according to claim 8, wherein said message set is so configured that when it is no longer received by said relay vehicle within a second time interval after the message set was first received by said relay vehicle, said message set is set to continue to be forwarded for a predetermined number of times and then to stop being forwarded by said relay vehicle, said second time interval is longer than the maximum length of said first time interval.

10. The message set according to claim 8, wherein said message set is set to stop being forwarded by said relay vehicle if the difference between current geographic coordinates of said relay vehicle and geographic coordinates of said relay vehicle when receiving said message set for a first time exceeds a first predetermined distance.

11. The message set according to claim 8, wherein said message set is set to stop being forwarded by said relay vehicle if said relay vehicle's travel distance after the message set was first received exceeds a second predetermined distance.

12. The message set according to claim 8, wherein said message set is set to stop being forwarded in a broadcast manner by said relay vehicle and to be repeatedly sent to said terminal device by said relay vehicle within a predetermined period of time if said relay vehicle has confirmed that said message set has been sent to said terminal device.

13. A messaging method for transmission of a message set (1) according to claim 1, comprising the steps of:
    determining whether a terminal device (4, 5) is presented within the communication range of the source vehicle (2), sending said message set to said terminal device by said source vehicle if said terminal device is presented within the communication range of said source vehicle, and repeatedly sending said message set by the source vehicle in a broadcast manner at a first time interval if said terminal device is not presented within the communication range of said source vehicle,
    determining whether said terminal device is presented within the communication range of said relay vehicle (3) receiving said message set, sending said message set to said terminal device by said relay vehicle if said terminal device is presented within the communication range of said relay vehicle, and repeatedly forwarding said message set in a broadcast manner at said first time interval by said relay vehicle if said terminal device is not presented within the communication range of said relay vehicle, and
    stopping the forwarding of said message set in a broadcast manner and repeatedly sending said message set to said terminal device for a predetermined period of time by said relay vehicle if said relay vehicle has confirmed that said message set has been sent to said terminal device.

14. The messaging method of claim 13, wherein the messaging method further comprises the step of:
    when said message set is no longer received by said relay vehicle within a second time interval after said message set was first received by said relay vehicle, continually forwarding said message set for a predetermined number of times by said relay vehicle and then stopping the forwarding, wherein said second time interval is longer than the maximum length of said first time interval.

15. The messaging method of claim 13, wherein the messaging method further comprises the step of:
    stopping the forwarding of said message set by said relay vehicle if the difference between current geographic coordinates of said relay vehicle and geographic coordinates when said message set was first received by said relay vehicle exceeds a first predetermined distance.

16. The messaging method of claim 13, wherein the messaging method further comprises the step of:
    stopping the forwarding of said message set by said relay vehicle if said relay vehicle's travel distance after said message set is first received exceeds a second predetermined distance.

17. The messaging method of claim 13, wherein said terminal device comprises a communication base station (4) and a roadside smart unit (5), and
    said messaging method further comprises the step of:
    determining whether said message set should be sent to said communication base station or to said roadside smart unit by said relay vehicle based on a terminal type indicator (114).

\* \* \* \* \*